Figure 1:
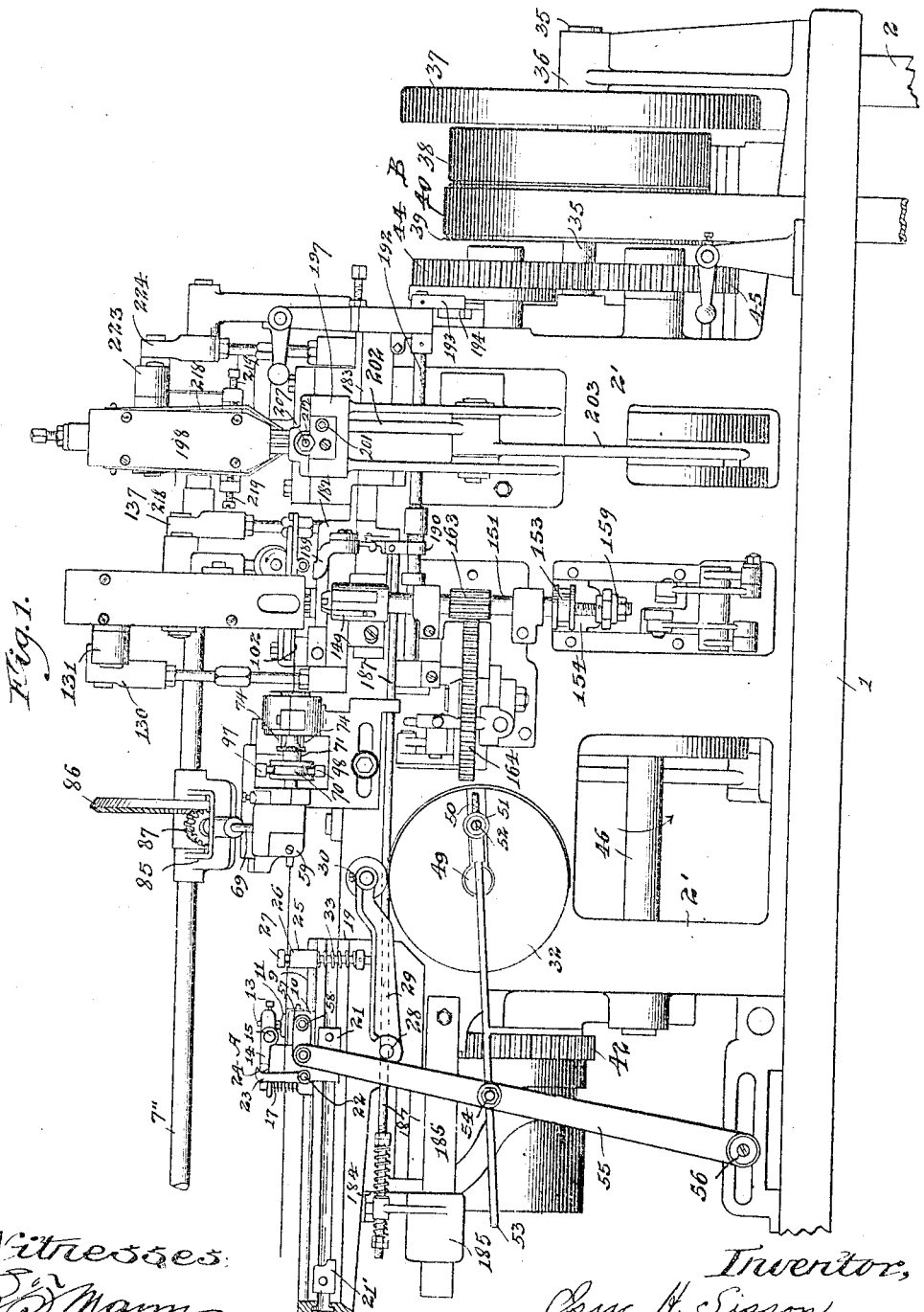

I. H. SISSON.
MACHINE FOR MAKING HAIR PINS.
APPLICATION FILED OCT. 15, 1910.

1,019,375.

Patented Mar. 5, 1912.

10 SHEETS—SHEET 1.

Witnesses

Inventor,
Isaac H. Sisson

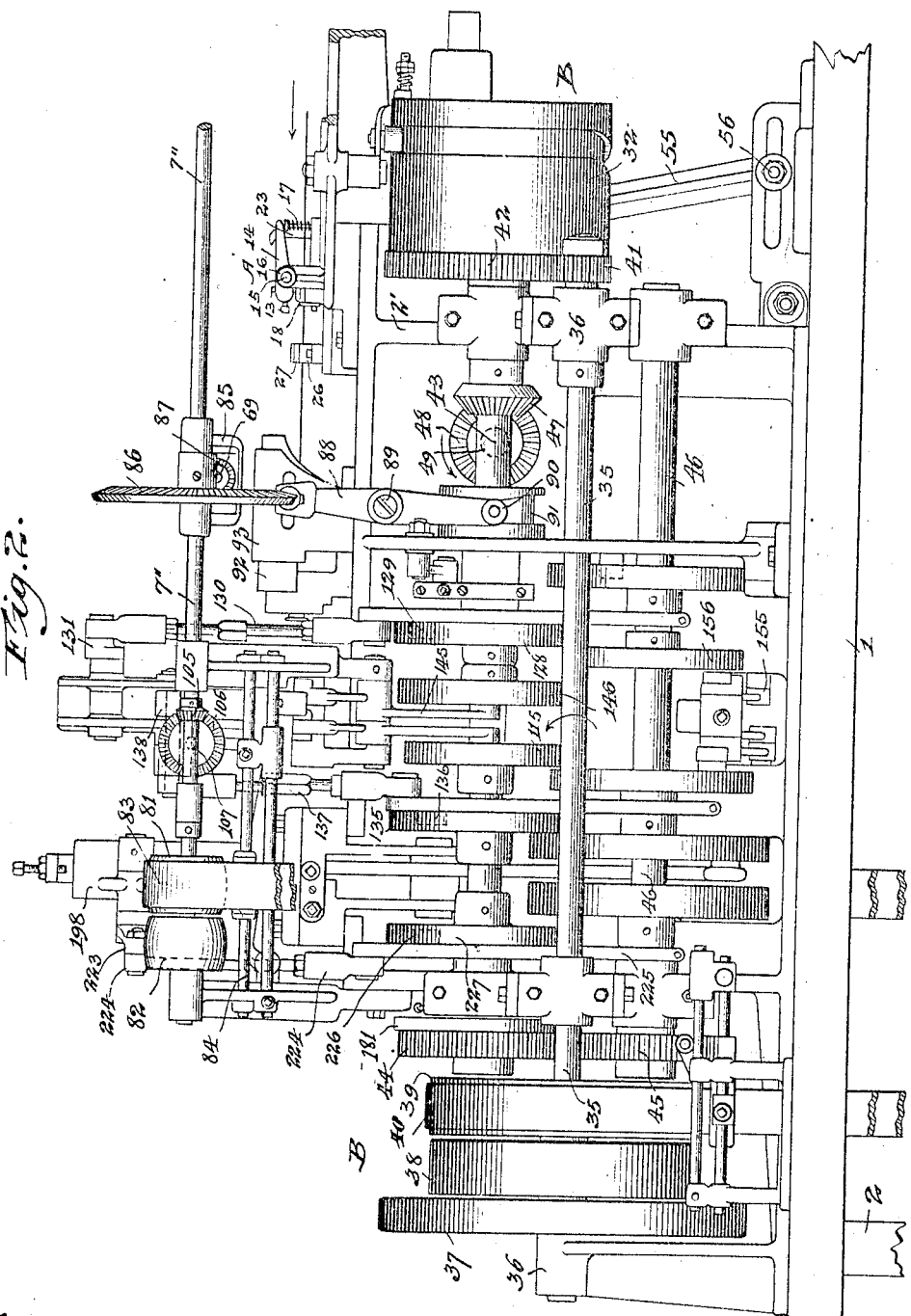

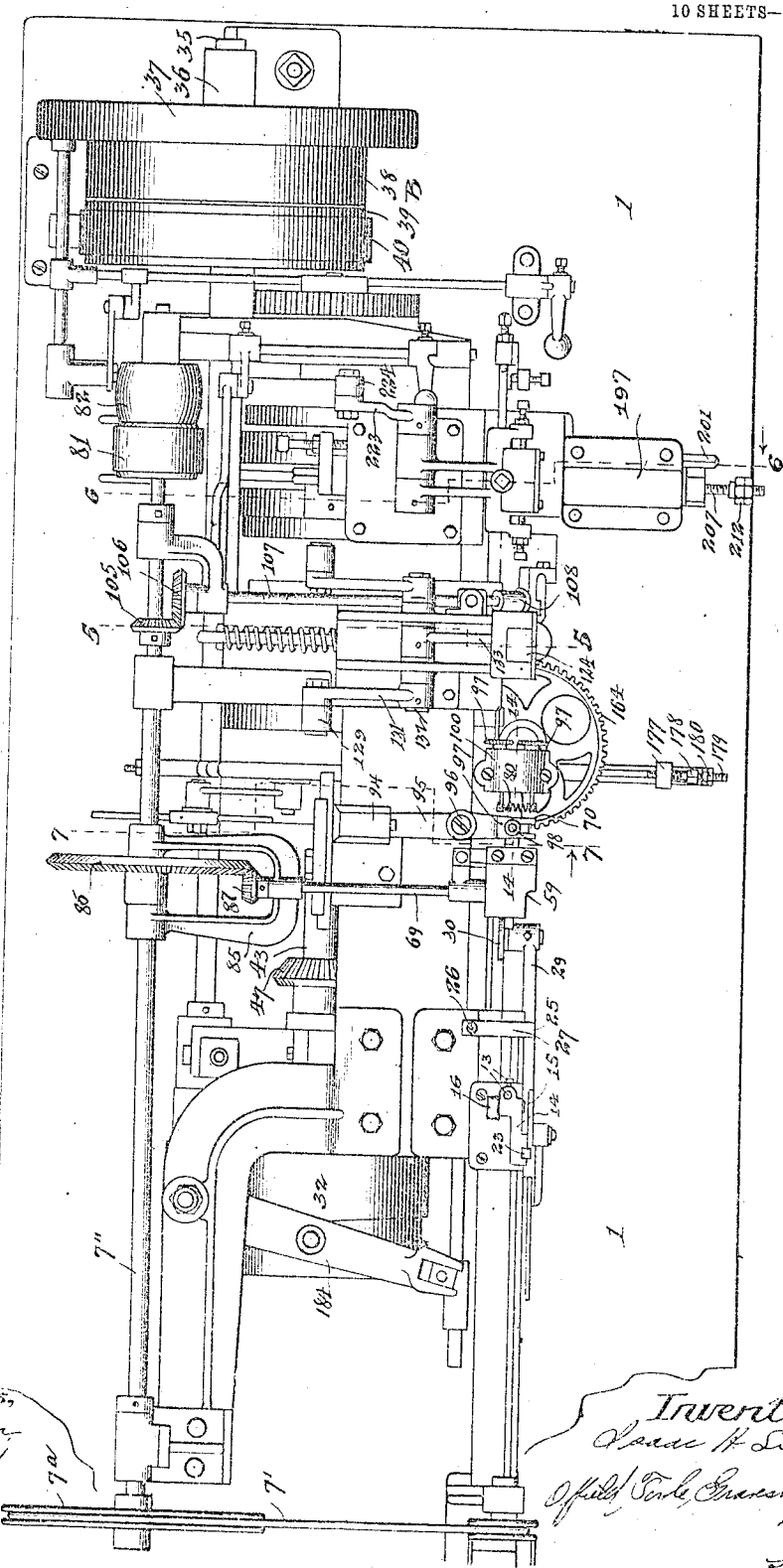

I. H. SISSON.
MACHINE FOR MAKING HAIR PINS.
APPLICATION FILED OCT. 15, 1910.
1,019,375.
Patented Mar. 5, 1912.
10 SHEETS—SHEET 4.
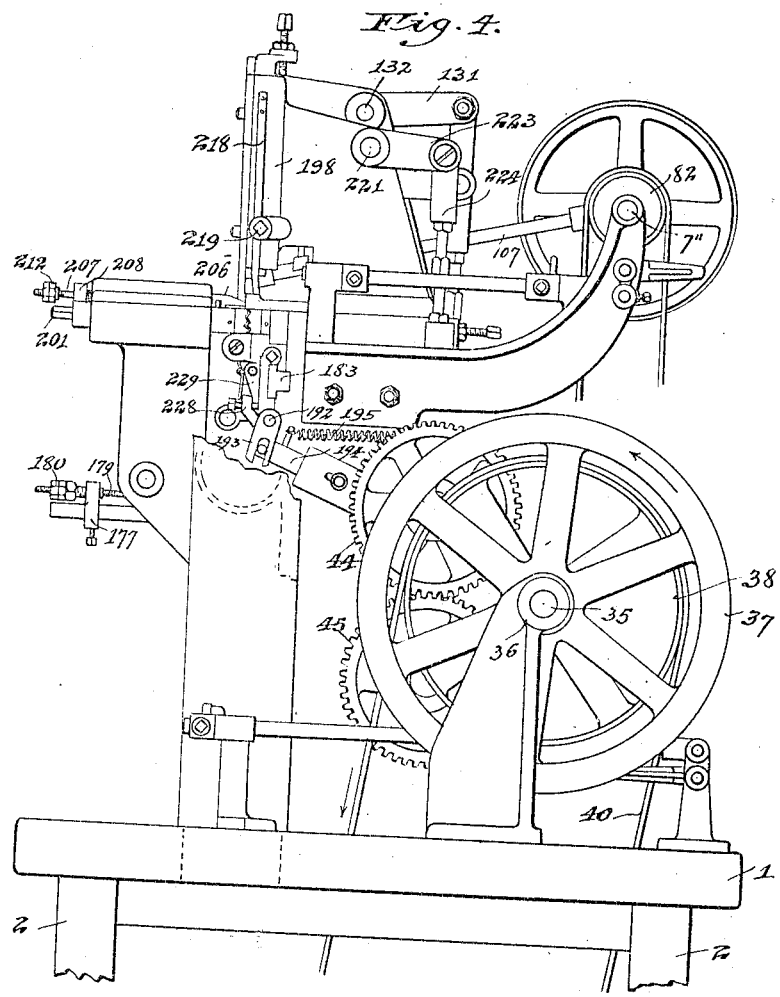
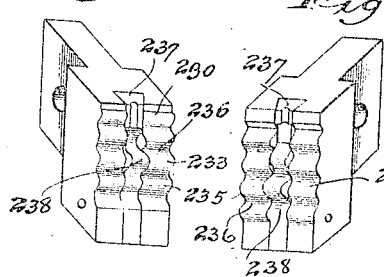
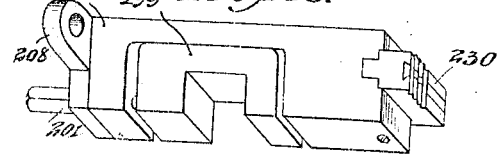
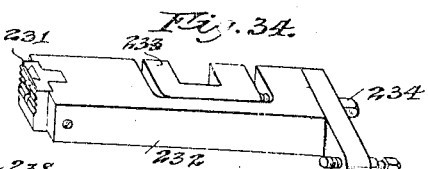
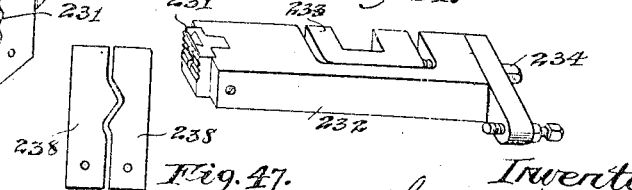

I. H. SISSON.
MACHINE FOR MAKING HAIR PINS.
APPLICATION FILED OCT. 15, 1910.
1,019,375.
Patented Mar. 5, 1912.
10 SHEETS—SHEET 5.
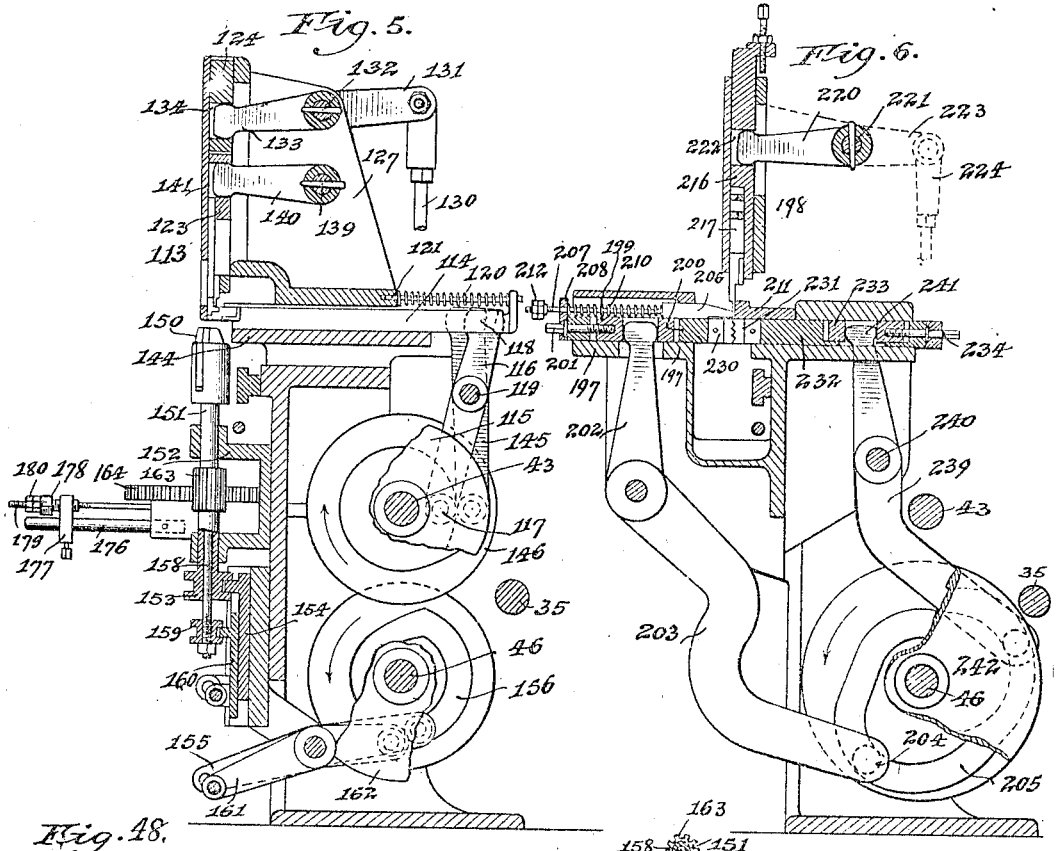
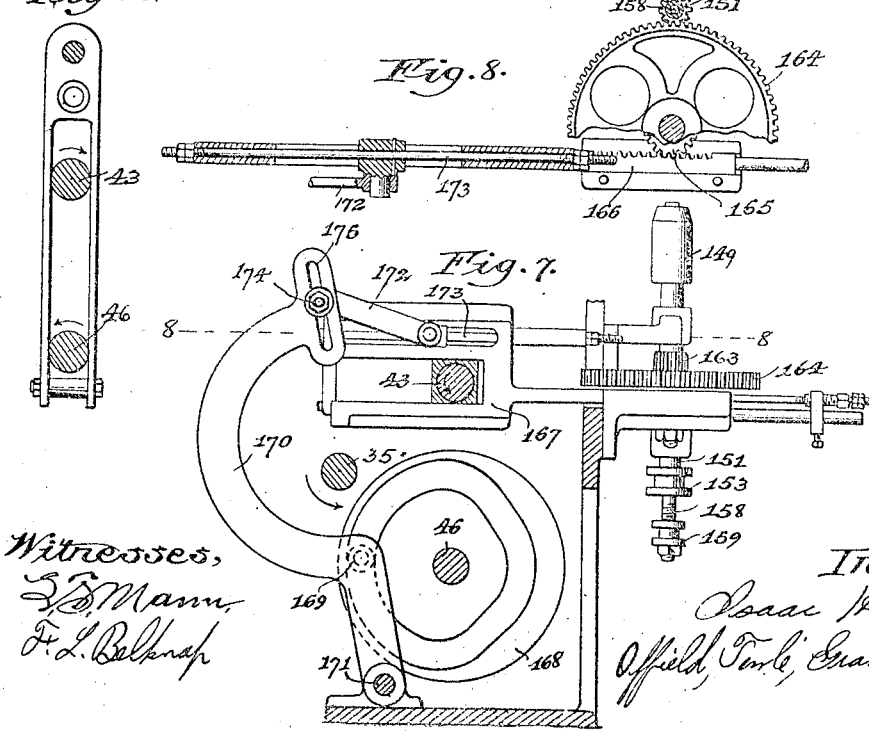
Witnesses,
S. S. Mann,
F. L. Belknap
Inventor,
Isaac H. Sisson
Offield, Towle, Graves & Offield
Attys.

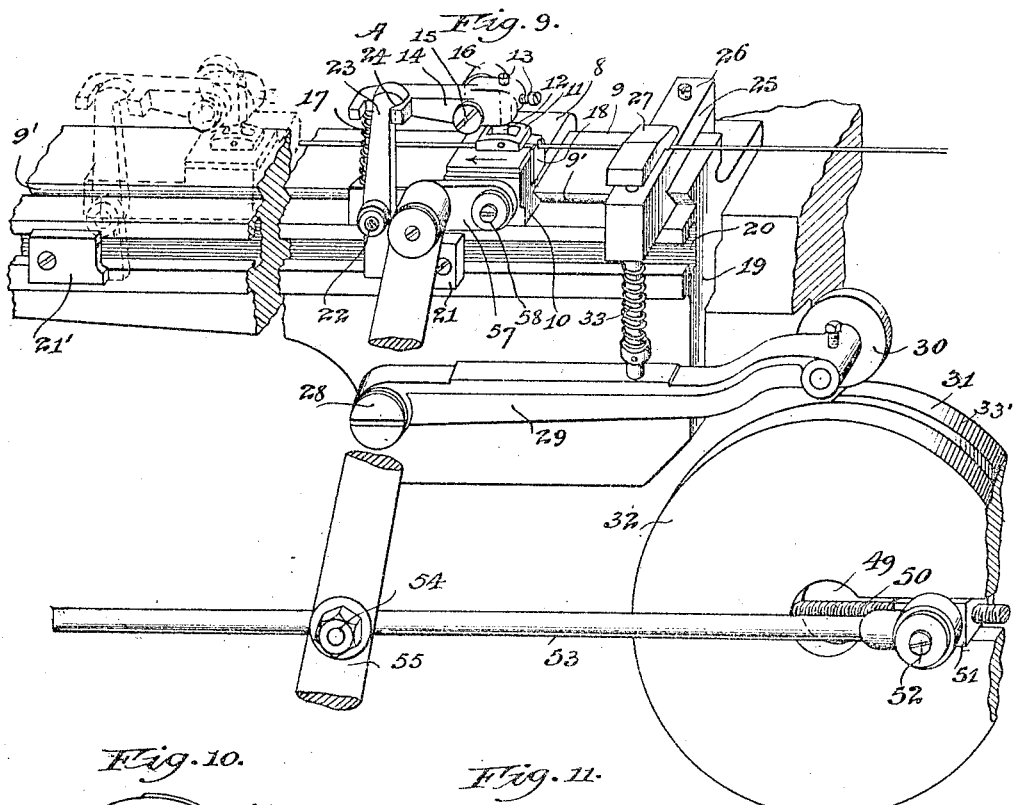
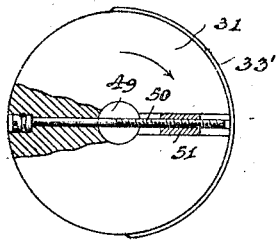
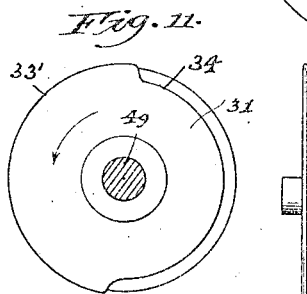
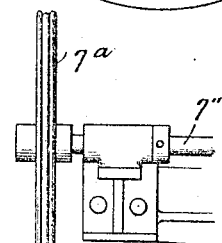
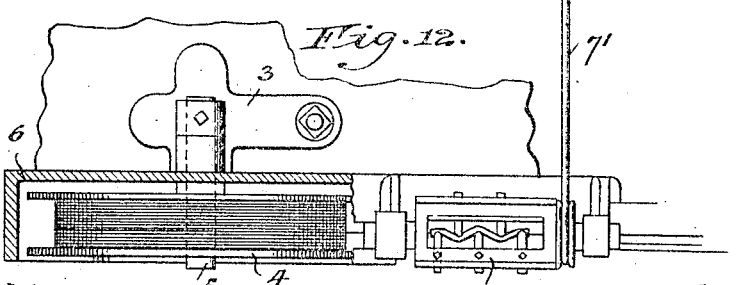

I. H. SISSON.
MACHINE FOR MAKING HAIR PINS.
APPLICATION FILED OCT. 15, 1910.
1,019,375.
Patented Mar. 5, 1912.
10 SHEETS—SHEET 7.
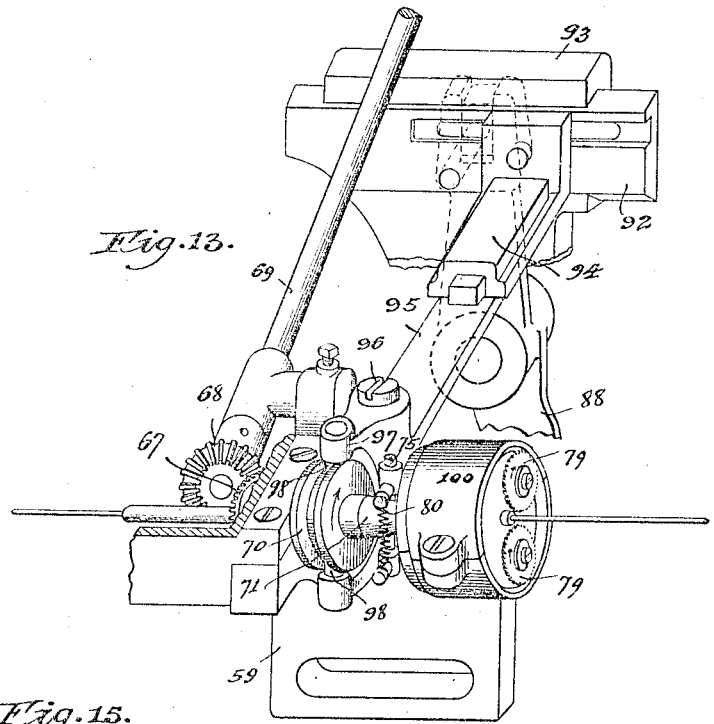
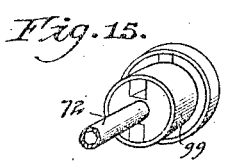
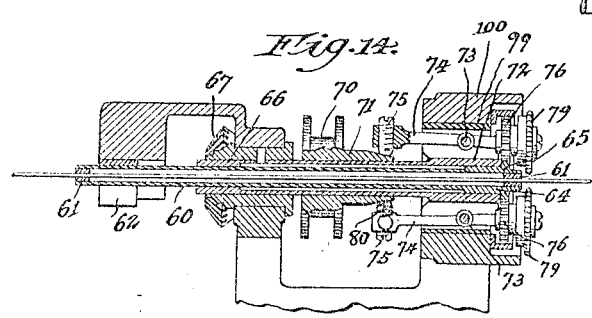
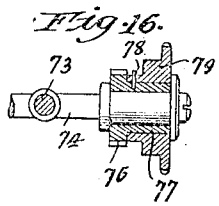
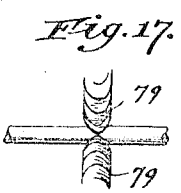
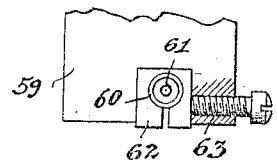
Witnesses
Inventor,
Isaac H. Sisson
By Offield, Towle, Graves & Offield
Attys

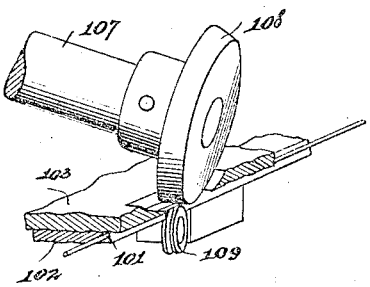
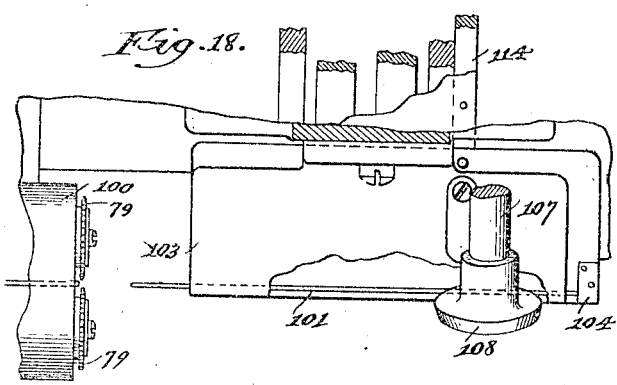
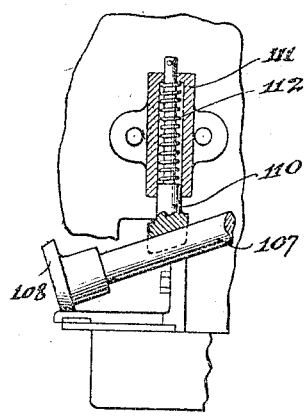
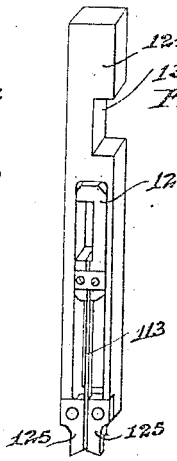
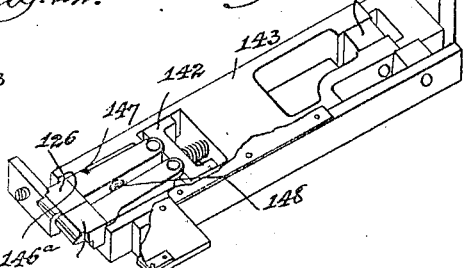
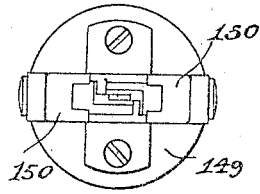
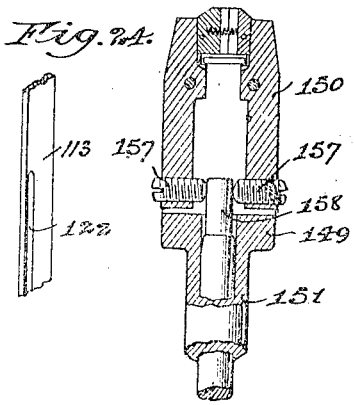
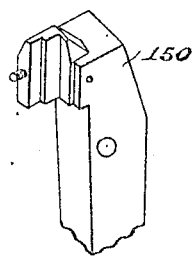

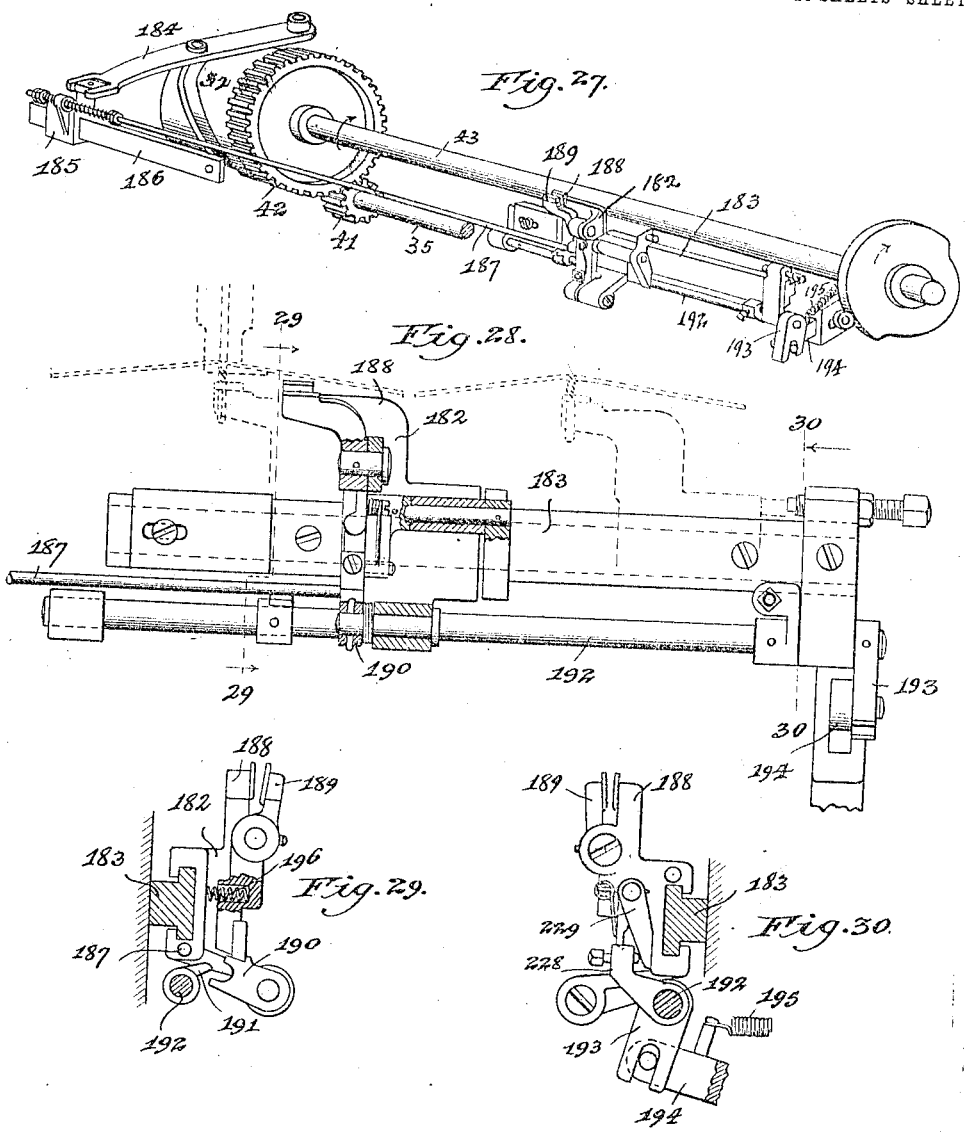

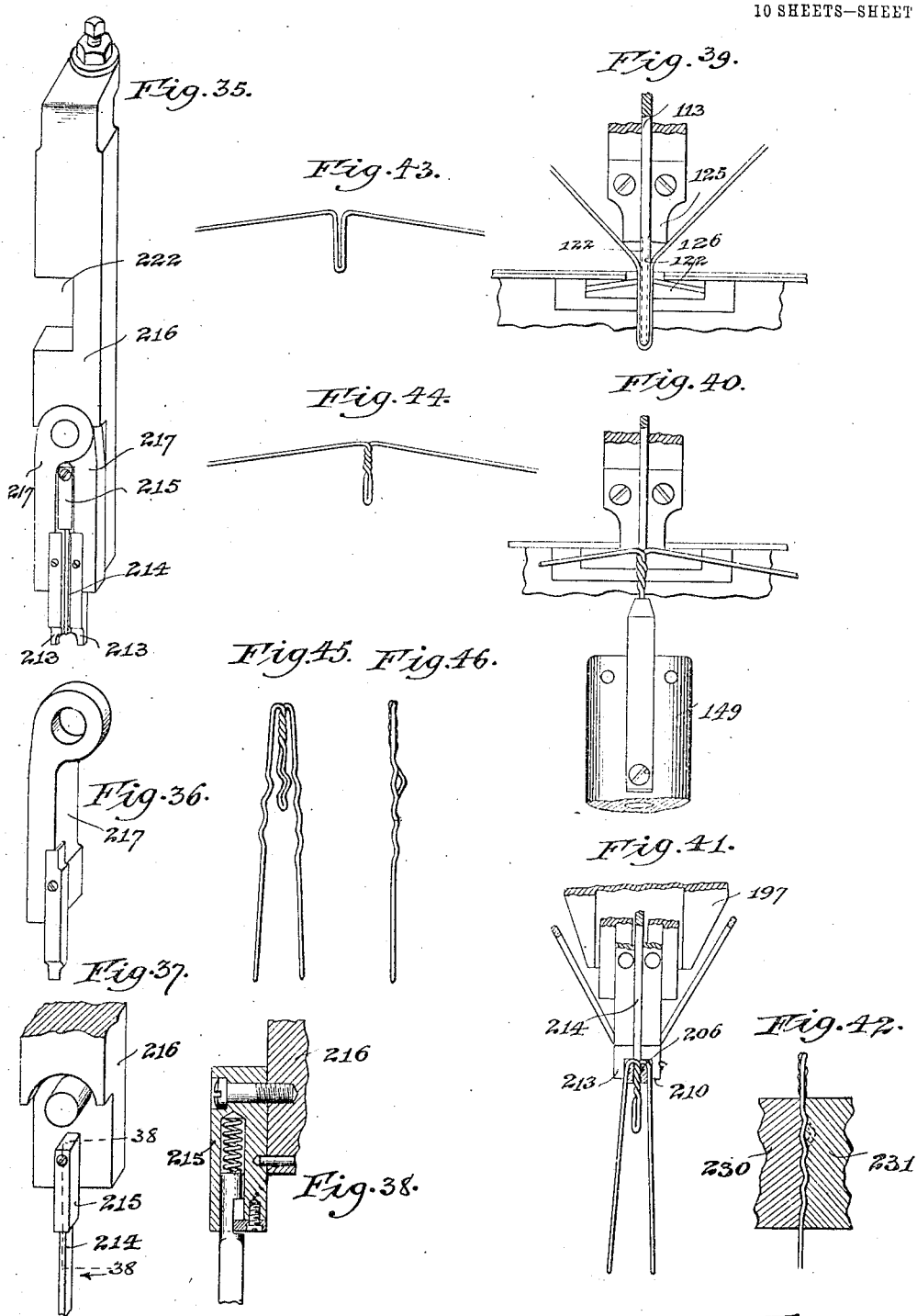

UNITED STATES PATENT OFFICE.

ISAAC H. SISSON, OF CHICAGO, ILLINOIS, ASSIGNOR TO SOLOMON H. GOLDBERG, OF CHICAGO, ILLINOIS.

MACHINE FOR MAKING HAIR-PINS.

1,019,375.  Specification of Letters Patent.  Patented Mar. 5, 1912.

Application filed October 15, 1910. Serial No. 587,245.

*To all whom it may concern:*

Be it known that I, ISAAC H. SISSON, a citizen of the United States, residing in the city of Chicago, county of Cook, and State of Illinois, have invented certain new and useful Improvements in Machines for Making Hair-Pins, of which the following is a specification.

This invention relates to machines for making hair-pins and refers more particularly to a machine for making hair-pins of the type shown in United States Letters Patent No. 748,278, granted to S. H. Goldberg.

Among the salient objects of the invention are to provide a machine for forming a novel type of hair-pin, the essential features of which consist in a pair of outer legs, a shorter central leg, the latter being provided with a hump portion; to provide in a device of the character referred to novel feeding mechanism for carrying the wire from the supply reel to the cutting mechanism, said feeding mechanism being provided with gripping and binding devices; to provide novel form of friction mechanism for conveying the severed blank to the proper position for the first forming operation; to provide means for initially forming the loop of the central leg and then twisting it as to its upper portion; to provide means for turning down the outer main legs of the hair-pin; to provide means for corrugating a portion of the outer legs of the hair-pin and simultaneously forming a hump and upturned end in the lower end of the central leg portion, this latter operation being a salient feature of the present invention; to provide improved mechanism for gripping and supporting the blank while the aforementioned operations are being performed; to provide a construction in which the aforementioned operations are carried on automatically and synchronously, the blank being shifted from one position to another in predetermined intervals without the aid of any manual control; to provide a construction in which hair-pins of the above general character are formed from a continuous strand of wire; to provide a machine in which the hair-pins may be produced accurately and uniformly with a minimum amount of waste; to provide a construction in which sundry detail parts may be repaired or replaced without necessitating the dismantling of any substantial part of the machine; to provide a construction which can be readily adjusted to make various sizes of hair-pins; to provide a construction in which the output of the machine as compared with prior devices is materially increased and at the same time with a lessened cost of production, and in general to provide an improved construction of the character referred to.

The invention consists in the matters hereinafter described and more particularly pointed out in the appended claims.

The present invention while more particularly intended to produce the type of hair-pin referred to, is in its broader aspects not so limited.

The hair-pin in question, however, as heretofore stated, is provided with a central leg formed of a double strand of twisted wire and provided with a "hump portion" near its lower end. The object of this hump portion is clearly set forth in the patent referred to and need not be here described in detail.

In the drawings,—Figure 1 is a side elevation of the front of the machine, the mechanism for straightening the wire, however, being removed. Fig. 2 is a similar view of the rear side of the machine. Fig. 3 is a top plan view of the machine, part of the bed frame being broken away. Fig. 4 is a front end elevation. Fig. 5 is a transverse sectional view taken on lines 5, 5 of Fig. 3. Fig. 6 is a similar section taken on lines 6, 6 of Fig. 3. Fig. 7 is a transverse sectional view taken on lines 7, 7 of Fig. 3. Fig. 8 is an enlarged horizontal sectional view taken on lines 8, 8 of Fig. 7. Fig. 9 is a fragmentary perspective view showing the mechanism for feeding the wire to the cutting mechanism. Fig. 10 is a detail sectional view of one end of the feed controlling disk. Fig. 11 is a similar view of the opposite side of the disk, the views in the last two figures, however, being shown on a slightly reduced scale to that shown in Fig. 9. Fig. 12 is a plan view partly in section of the reel for holding the wire and showing also a portion of the adjacent end of the machine. Fig. 13 is a fragmentary perspective view of the wire cutting mechanism. Fig. 14 is a vertical sectional view taken substantially on lines 14, 14 of Fig. 8 and showing the cutter mechanism, parts however being omitted. Fig. 15 is a fragmentary perspective view on a reduced scale of the casing for the cutting spindles. Fig. 16 is a detail sectional view of one of the cutters and its associated gear. Fig. 17 is a detail view showing the manner in which the cutters sever the wire. Fig. 17' is a sectional detail showing the manner of mounting the outer end of the central stationary guide tube. Fig. 18 is a fragmentary top plan view, partly in section, showing the friction mechanism for feeding the wire after it has been severed. Fig. 19 is a fragmentary perspective view of said friction feeding mechanism shown on an enlarged scale. Fig. 20 is a fragmentary side elevation partly in section of another portion of said friction feeding device and showing more particularly the manner of maintaining the revoluble member under spring tension. Fig. 21 is a fragmentary perspective view of the mechanism for forming the center leg of the hair-pin. Fig. 22 is a perspective view of the holder for the top bending dies and center plunger. Fig. 23 is a top plan view of the rotary twisting chuck. Fig. 24 is a fragmentary perspective view of the lower end of the center plunger. Fig. 25 is a vertical sectional view on a reduced scale of the rotary twisting chuck. Fig. 26 is a fragmentary perspective view of one of the chuck jaws. Fig. 27 is a perspective view of the main wire carrier and actuating mechanism. Fig. 28 is a front elevation, partly in section, on an enlarged scale of said carrier, the various positions of the carrier being shown in dotted lines. Fig. 29 is a cross sectional detailed view taken on lines 29, 29 of Fig. 28. Fig. 30 is a similar view taken on lines 30, 30 of Fig. 28. Figs. 31 and 32 are perspective views on an enlarged scale of the crimping dies. Fig. 33 is a perspective view of the front crimping die and holder. Fig. 34 is a similar view of the rear crimping die and holder. Fig. 35 is a perspective view on an enlarged scale of the leg bending and crown dies showing also the center plunger and holder. Fig. 36 is a detached perspective view showing one of the crowning dies and holder. Fig. 37 is a detail perspective view of the center plunger and holder. Fig. 38 is a vertical sectional view on an enlarged section taken on lines 38, 38 of Fig. 37. Fig. 39 is a fragmentary front elevation showing the manner of forming the initial or center bend in the wire blank. Fig. 40 is a view similar to Fig. 39 and showing the manner of twisting the center leg. Fig. 41 is a similar view showing the manner of bending down the outer legs. Fig. 42 is a sectional view showing the manner of forming the hump and up-turned end of the center leg. Figs. 43 and 44 show the hair pin in various stages of formation and Figs. 45 and 46 are front and side elevations respectively of the completed hair-pin. Fig. 47 is a detail of the hump forming dies. Fig. 48 is a detail sectional view of two of the operating cam shafts.

Referring to the drawings,—1 designates as a whole the bed frame of the machine which is preferably supported above the floor by means of suitable legs 2, which, however, form no part of the present invention. This bed frame is provided with standards 2' which serve to support various parts of the machine hereinafter described. At the rear end of the machine upon the bed plate is secured by means of a bracket 3, a reel 4 journaled on a pin 5 carried by the bracket and preferably inclosed in a housing 6. Upon this reel is mounted a coil of wire which is fed through a straightening device 7 of well known construction, to the main feeding mechanism designated as a whole A. The straightening device 7 is kept in continuous rotation by a driving belt 7' leading from the pulley 7ᵃ which is secured to the upper rear shaft 7". The manner of driving this shaft 7" will be hereinafter described. This feeding mechanism comprises a feeder carriage 8 mounted to slide longitudinally upon a suitable track-way 9 carried by one of the standards 2' and associated brackets. The track-way is provided with inwardly beveled edges 9' having dove-tailed like connection with the legs 10 of the carriage. This carriage is provided with a vertically movable top clamping member 11 having a stud extension 12 which is secured by set screws 13 to a rocker lever 14, journaled on a screw pin 15, mounted in an arm 16 secured to the carriage. The free end of this arm 14 is normally forced upward by a coiled spring 17 so as to bring the shoe 11 into clamping engagement with the wire. The latter preferably extends through a guide 18 secured to the carriage. The front side of the bracket 19 which supports this feeding mechanism is provided with a dove-tailed groove 20 in which is adjustably mounted a stop 21. To the opposite end of the guideway 20 is similarly secured another stop 21'. To the carriage 8 is pivotally secured at 22 a lever 23 adapted to interlock with the rocker arm 14. To this end the head of the lever 23 is provided with a beveled portion 24 in order that it may more readily enter the notched portion of the arm 14. When the feeder is in action the lever and rear arm are unlocked. At or about the instant the carriage arrives at the forward end of its stroke, the lower part of the lever 23 engages the adjustably mounted front stop or dog 21 causing the upper part of the lever to engage and interlock with the arm. This action depresses the arm and lifts the shoe 11 out of clamping engagement with the wire. When the feeder is thus released from the wire, it returns to the end of its rearward stroke, the lever 23 at the same instant engaging the rear stop 21' and unlocking the members, thereby freeing the spring 17 which forces the rocker arm upwardly and causes the shoe to frictionally engage and clamp the wire. The unlocked position is shown in dotted lines in Fig. 9.

To prevent the wire from buckling I provide an auxiliary clamping or binding device, designated as a whole 25. This consists of a fixed base member 26 secured to the track 9 and a downwardly spring pressed gripper or jaw 27 between which and the upper face of the base 26 the wire is fed. Upon the frame is pivoted as shown at 28 a swinging arm 29, the free end of which carries a cam roller 30 which is in continuous rolling engagement with a cam disk 31 concentric with a crank disk 32 hereinafter described. Upon the arm 29 is mounted a spring pressed rod 33 which extends through the base 26 and acts upon the binder or clamp 27. The arrangement is such that the raised cam surface 33' will, through the action of the roll 30 and arm 29, keep the jaw 27 in open position while the carriage is advancing the wire, corresponding, say to one-half the revolution of the cam. On further revolution of the cam the spring pressed jaw will automatically drop into engagement with the wire and hold it stationary during the rotation or back stroke of the feeder. During this latter operation the roller 30 will be riding on the surface 34 of the cam.

Describing now the manner of operating this feeding mechanism and describing first the main general driving element, at the right or front end of the machine is located the main driving mechanism designated as a whole B. This mechanism and driving mechanism includes the horizontal primary shaft 35 mounted in suitable bearings 36 having a balance wheel 37, and loose and fast pulleys 38 and 39 respectively. A driving belt 40 is also provided. This main shaft is located at the back side of the machine and extends longitudinally toward its left or rear end. At that end of the frame opposite the driving pulleys, the shaft 35 is provided with a spur gear 41 (see Fig. 2) intermeshing with a larger gear 42 secured to and adapted to rotate the upper cam shaft 43. On this cam shaft is fixed a main barrel cam 32 for actuating the carrier of the feeder. This upper cam shaft 43 extends longitudinally of the machine and has secured to its front end a spur gear 44 which meshes into a similar sized gear 45 secured to the adjacent end of the lower revolving cam shaft 46. The lower cam shaft 46 is parallel with the shaft 43 and located directly beneath it. It may be here stated that through these main driving shafts and connections the various mechanisms for forming the several features of the hair-pin are actuated and controlled.

The main wire feeding mechanism heretofore described is actuated in the following manner: Upon the upper cam shaft 43 is secured a miter gear 47 (Fig. 2). A similar gear 48 meshes with the gear 47 and is fixed to the short transverse shaft 49. This transverse shaft has secured at its front end the crank disk 32. To vary the feed stroke, in the slot of the disk 32 is mounted a screw 50 having a sliding nut 51 to which is pivoted as shown at 52 a rod 53. The latter is adjustably clamped as shown at 54 to the relatively long lever 55, fulcrumed as shown at 56 to the base of the machine. The upper end of this lever 55 is jointed to a short link 57 pivoted as shown at 58 to the carriage of the feeder. The operation of the parts just described is such as to impart a reciprocating rectilinear movement to the feeder carriage. The full lines represent the feeder in advanced position while the dotted lines indicate its retracted position immediately preceding the next feeding action.

From the foregoing it will be seen that as the shaft 49 is driven by the main driving mechanism above described, the crank arm 55 will be actuated and the carriage reciprocated back and forth on its trackway. At the same time the action of the cam disk 31 is such as to synchronously operate the gripper finger 27 to hold the wire during the cutting and pointing operations.

Referring now to the wire severing and pointing mechanisms and referring more particularly to Figs. 13 to 17 inclusive, a head or casting 59 for carrying the cutting tools is adjustably secured to the main frame in order that the cutting tools may be bodily moved longitudinally of the machine to properly position them to and from the center of the twisting chuck and coöperating center leg dies corresponding with the length of the wire blanks and the different sizes of hair-pins to be produced. In said casting 59 is mounted a hollow spindle 60 locked in alinement with the advancing blank. The latter extends through a collar or bushing 61 drilled to the gage of the wire used and removably mounted in the rear end of the spindle. The latter in turn passes through a split holder or block 62 secured in the casting and held in position by means of a screw 63, as shown in Fig. 17'. The opposite or front end of the spindle 60 is provided with a gage collar 64 removably mounted thereon, and a spur gear 65. On this stationary spindle is rotatably mounted a sleeve 66 driven by means of a miter gear 67 secured thereto and meshing with a smaller gear 68 upon the front end of the continuously rotating shaft 69. The manner of driving this shaft will be hereinafter described.

Upon the shaft or sleeve 66 is slidably fitted a clutch member 70 having a cone or cam shaped extension 71. The front end of the shaft or sleeve 66 has an enlarged hollow head 72 in which are pivotally mounted, as shown at 73, a pair of oppositely disposed rocker arms 74, each having at its free end a cam screw 75 adjustably mounted therein. These cam screws have continual frictional engagement with the cam surface of the cone shaped extension 71. The opposite end of each arm 74 is provided with a spur gear 76 loosely mounted thereon. To the hub 77 of the gear is keyed, as shown at 78, a disk or cutter 79. The gears 76 mesh with the stationary gear 65 of the spindle, the arrangement being such that both cutters revolve in unison in one direction and at the same time revolve bodily around the wire. These cutters are moved to and from each other by means of the cam 71 and cam screw 75 when the clutch 70 is operated. The shape of the cutters is such as to completely sever the wire extending through the bushings 61 and at the same time properly point the ends as shown more clearly in Fig. 17. A spring 80 connects the free ends of the arms 74 and serves to hold them yieldably in engagement with the cam hub 71.

The shaft 66 and associated cutters are driven in the following manner: The upper rear shaft 7″ heretofore referred to is driven by a pulley 81 fixed thereto and an associated loose pulley 82, the power being transmitted to the belt 83 from any suitable source. Below the pulleys is mounted a sliding rod 84 having a belt shipper for shifting the belt in a well known manner. On this shaft 7″ about midway thereof is mounted a yoke shaped head 85. To the shaft at this point is splined a large bevel gear 86 which meshes with a smaller gear 87 secured to the end of the transverse shaft 69. The arrangement is such that the beveled gear and heads 85 may be shifted longitudinally on the shaft 7″ thus permitting the shaft 69 to move with the adjustable casting 59 heretofore referred to. The turn of the gears just described operates the shaft 69 which in turn drives the sleeve 66 carrying the cutters.

It will be remembered that the cutters are thrown into and out of operative position by means of the cam hub 71 and clutch 70. Describing the manner of operating this clutch, upon the back of the machine is mounted (Figs. 2 and 13) a swinging vertical lever 88 pivoted between its ends as shown at 89 and provided with a roller 90 which engages a cam drum 91 secured to the shaft 43. The upper arm of this lever is connected to a cross head 92 slidably mounted in longitudinally extending ways formed in the supporting bracket 93 secured to the main frame. A forwardly projecting block 94 is adjustably secured in the cross head 92 and to this block the rear end portion of the clutch actuating lever 95 is slidably secured. This arrangement provides means for accurately changing, within certain limits, the degree of clutch movements in an endwise direction. This clutch lever is also capable of adjustment to provide for variations in length of the wire blanks. This lever 95 is fulcrumed at 96 and is forked at its front end as shown at 97. This fork or yoke shaped extension is provided with pins 98 which engage the groove of the clutch disk 70. It may be here stated that the head 72 of the shaft 66 is preferably inclosed in a cylindrical shell 99, the whole being revoluble in a housing formed in the upper extension 100 of the casting 59.

In feeding the wire through the guide tube 60 the predetermined distance to produce the desired length of blank, the wire enters an alined open groove 101 formed in a laterally movable top guide plate 102 mounted in the upper end of the main frame, which is preferably protected by a stationary cap plate 103. When the wire blank has been severed it lies in this groove 101 and is there picked up and carried forwardly by the auxiliary feeding mechanism. This friction mechanism serves to take the severed blank and carry it to the stop 104 to place the center of the blank in register with the twisting chuck. Describing this friction mechanism, to the upper shaft 7″ is secured a small beveled gear 105 meshing with a gear 106 (Figs. 2 and 3), the latter being secured to the downwardly inclined shaft 107. This shaft carries at its front end a friction wheel 108. The rim of this wheel is beveled as shown in Fig. 19 and is adapted to engage the exposed upper side of the wire blank which is at that point supported in the grooved periphery of a small idler roll 109 located immediately below the wheel 108. This wheel 108 is maintained in yieldable frictional engagement with the blank by means of a downwardly spring pressed plunger 110 mounted in a suitable socket 111 secured to the frame and provided with a coiled spring 112. The construction of the auxiliary blank feeding positioning mechanism is such that it is capable of adapting itself automatically to wire blanks of varying diameter.

The guide plate 102 is advanced bodily sidewise or laterally so as to be in proper position relatively to the vertical center plunger 113 by means of suitable guide moving mechanism. This latter mechanism comprises an endwise movable horizontal bar 114, cam 115 (Figs. 5 and 18) secured to the shaft 43, and a swinging lever 116 engaging the cam and bar as shown at 117 and 118 respectively. This lever is pivotally mounted as shown at 119. A spring 120 secured to the supporting bracket as shown at 121 serves to keep the bar in such position that the lever is normally in contact with the cam. It will be apparent that upon each revolution of the shaft 43 the plate 102 will be advanced and retracted to spring the wire blank into and out of register with the center plunger 113.

In order that various sizes of wire may be used, the machine is provided with a series of plates 102 having grooves corresponding with the given sizes of hair pins to be produced. Each of these plates also has a stop 104 and roller 108 and is cut away to permit the friction wheel 109 to engage the wire. The arrangement is such that the plate with its roll moves back and forth bodily in a lateral direction but the wheel 108 rotates only on its axis.

The initial forming operation consists in bending the blank back upon itself to form a single loop and at the same time turning down the upper ends of the loop to form the outer leg portions. To this end the center plunger 113 heretofore referred to has oppositely disposed grooves 122 (Fig. 24) in its vertical faces to receive the wire. This plunger is removably fastened in a holder 123 slidably mounted in a vertically movable main holder 124 securing at its lower end a pair of laterally separated top bending dies 125. The ends of these dies are oppositely inclined so as to constitute when in coöperation with the central plunger 113 and the pair of anvil members 126 the mechanism for forming in the severed blank, the initial central bend or loop and also to bend the upper ends of the loop at an angle, as shown more clearly in Fig. 39 preparatory to being formed into the outer side legs of the hair-pin. This holder 124 is movably fitted in a bracket 127 secured to the main frame (Fig. 5). This holder 124 is actuated in the following manner; A cam 128 is mounted on the cam shaft 43 and is engaged by a cam roller 129 secured to the lower end of a rod or link 130, the upper end of which is pivoted to an arm or crank 131 secured to a rock shaft 132 mounted in the upper end of the bracket 127. A lever arm 133 is secured to the shaft 132 and actuates the holder 124. The latter is recessed as shown at 134 to receive the enlarged head of the arm 133. As thus constructed the holder and its forming dies 125 are moved intermittently. Similarly but independently thereof suitably timed movements are given to the central plunger 113 in the following manner. Upon the shaft 43 is likewise mounted a cam 135 which is engaged by a cam roller 136 carried by an adjustable link 137, the upper end of which is secured to a horizontal crank arm 138 pivoted to a short shaft 139 mounted in the head 127. To this shaft 139 is fixed a lever arm 140 which engages a slot 141 in the holder 123. From the foregoing it will be seen that the two holders 124 and 123 are intermittently actuated by reason of cam connections just described.

Referring now to the anvil members 126, they are pivoted at their rear ends to a spring pressed lock 142 slidably mounted in and carried by a horizontal frame 143. The latter, which is mounted adjacent the arm 114, rides upon a suitable plate 144 and is actuated intermittently in an endwise direction by a lever 145 engaging at its lower end a cam 146 secured to the cam shaft 43. In normal action the member 143 is first retracted until the inner beveled parts 146$^a$ located near its outer end pass the corresponding lugs 147 of the then fully advanced and positioned anvils, at which position the spring 148 of the block 142 forces the anvils apart. The plunger 113 then descending engages the center of the wire blank then supported on the temporarily advanced plate 102 as before stated. As the plunger descends it passes between the adjacent sides of the anvil carrying with it the wire and thus looping or folding the latter upon itself. (See Fig. 39.) The side forming dies 125 then descend and bend the lateral portions of the wire, which later form the side legs. The blank thus shaped is shown in Fig. 43.

While the plunger 113 is moving upwardly the plate 143 is advanced and thereby through the conjoint action of the shoulders 147 and 146, forcibly pressing the anvils toward each other to engage and hold the center leg part which has just been bent of the blank between the anvils and also at the same time to practically close the space lying between the adjacent sides of this leg portion. Fig. 21 shows these anvils in this closed position. While the bending dies 125 and the anvils are still in engagement with the center leg portion, the preceding chuck hereinafter described, which is in alinement with the center leg portion, is moved upwardly to receive the lower portion of the center leg between its jaws. Describing this rotary reciprocatory twisting mechanism, a chuck head 149 having a pair of oppositely disposed pivotally mounted clamping jaws 150, is mounted on a tubular central shaft 151. This shaft extends downwardly through a bracket 152 secured to the frame and is provided at its lower end with a grooved collar 153 which is in continuous engagement with a reciprocatory cross head 154 mounted in a suitable guide-way. This cross head is shifted by a double armed lever 155 actuated by a cam 156 secured to the lower cam shaft 46.

The arrangement just described is for moving the then non-revolving twisting chuck bodily in a vertical direction. A somewhat similar mechanism is used for closing and opening the jaws of the revoluble chuck. To this end an adjusting screw 157 is mounted in the lower portion of each jaw 150 and at its inner end frictionally engages the upper portion of an endwise movable and revoluble rod 158 extending through the hollow shaft 151. The lower end of this rod 158 is provided with a grooved collar 159 which engages a vertically movable cross head 160. This cross head 160 is actuated by a lever 161 which coöperates with a cam 162 secured to the cam shaft 46. As thus constructed the jaws are automatically opened and closed at proper predetermined intervals to receive and hold edgewise therebetween the closed central loop portion of the blank during the twisting operation and release the same after it has been twisted. This twisting operation (Figs. 1, 5, 7 and 8) is as follows: An elongated relatively small spur gear 163 is secured to or integral with the tubular shaft 151 and meshes with a relatively large gear 164. To the latter is secured a centrally disposed spur gear 165 which is driven by an endwise shiftable transversely arranged rack 166. In order to actuate the rack, thus rotating the shaft 151 through the gears just described, and thus revolving the chuck, the rack is connected to a slidably supported frame 167. This frame is actuated as follows: To the shaft 46 is secured a cam 168 which is engaged by a roller 169 carried by a curved arm 170 pivoted to the frame as shown at 171 and connected by a slot and pin at its upper end to a pivot link 172. This link is secured to a horizontal rod 173 mounted in the frame 167. The stroke or movement of the rack and consequently the arc traveled by the gear 164 may be changed by shifting the position of the link pin 174 up or down in the slot 175 of the arm 170. As thus devised the looped wire blank shown detached in Fig. 43 remains firmly supported between the anvils and side forming dies until the then open jawed twisting chuck is moved upwardly to receive the center leg as described. When the jaws close upon the loop of the blank the chuck is rotated a plurality of turns as limited by the previously determined movements of the rack 166 and its coöperating parts. The upper portion of the two parallel sides of the blank when thus twisted together have the form of a double helix. Fig. 40 shows the blank thus far formed but still held in the jaws, and Fig. 44 shows the same detached.

A device is employed for insuring that the rotary movement of the twisting chuck will cease at a predetermined interval. This mechanism comprises a stationary, forwardly extending rod (Fig. 5) 176 located adjacent the rack and having a collar 177 fixed thereon. This collar is apertured to receive the tubular bolt or adjustable stop 178 through which the small screw-threaded stem 179 secured to the forward end of the rack freely passes. Upon the outer end portion of the stem 179 are secured nuts 180 positioned to contact with the stop 178 during certain portions of the rack's stroke to arrest its movement, thereby providing for play or lost motion in the gearing and connections and causing the chuck-head to cease its movement, the jaws of the latter then registering with the depending central loop of the blank.

The main carrier 182 is slidably mounted on a fixed horizontal T-piece 183 locked to the front side of the machine and extending longitudinally thereof. The carrier is moved back and forth by means of a pivoted lever 184 having a suitable roller which engages the cam path of the cam disk 32. The free end of this lever is jointed to a cross head 185 sliding on fixed ways 186. A comparatively long spring pressed rod 187 is adjustably mounted in and carried by the cross head, its opposite end being secured to the carrier 182.

The carrier 182 is provided with a relatively stationary jaw member 188 and spring pressed movable jaw 189. The carrier frame has a short extension in front provided with a swinging spring resisted latch 190 adapted to be tripped by the dog 191, secured to a front rock shaft 192. This rock shaft is provided at its right end with a short arm or link 193 which is jointed to a spring pressed sliding member 194 having a spring 195. This member 194 is provided with a roller which frictionally engages a cam 180 secured on the continuously revolving cam shaft 43. When the roller passes from the high to the low part of this cam 180, the spring attached to the member 194 retracts the latter, thereby moving the arm 193 and its rock shaft 192 an angular distance thus swinging the chuck 191 downwardly to engage and depress the latch 190 and release the jaw 189. The push spring 196 of the latter then opens the jaws.

While the preceding chuck is in action the carrier 182, the jaws thereof being open, is advanced to the left or nearly to the chuck and remains stationary until the twisting of the center leg of the hair-pin has been effected. The chuck then commences to retreat, at which instant the main cam 32 advances the carrier a short distance, or to the dotted position shown at the left of Fig. 28. The center leg of the still supported blank is then received by the jaws and the latch 190 positioned with reference to its dog 191. At substantially the same time the cam 181, as before described, trips the latch and releases the movable jaw 189. At the same time the anvils and side forming dies are retracted from their respective positions, thereby freeing the twisted blank and the latter is wholly supported by the jaws of the carriage 182. The main cam and associated mechanism next moves the carrier toward the right or front end of the machine (see corresponding position indicated by dotted lines in Fig. 28) thereby placing the blank directly under the crowning tools.

The central leg of the blank has now been twisted and is ready for the crowning operation. Crowning devices as a whole are mounted in fixed brackets 197 and 198. The bracket 197 is located in front and supports the endwise slidable transverse bars 199, 200, adjustably connected together by a bolt 201. This construction permits of a very close and accurate adjustment of the parts so that the crimping dies hereinafter described are adapted to receive various diameters of wire. The said connected bars 199 and 200 are concurrently actuated by an arm 202 extending through a suitable slot in the member 200 and in turn actuated by the irregularly curved lever arm 203 having a cam roller 204 which engages the cam path of a cam 205, mounted on the lower cam shaft 46 (Fig. 6). The anvil member 206 of the crowning tools is suitably supported and guided, as shown in Fig. 6, and has a stem 207 which extends through an ear 208 secured to the bar 199. The forward or working end of the anvil 206 is bifurcated (Fig. 41) to receive the upper part of the central leg and also forms a support for the adjacent portions of the crown or arch. The anvil 206 is spring pressed by means of a spring 210 and is mounted to move endwise in a horizontal plane, its forward or free end being adapted to yieldably engage a fixed stop 211 and confine therebetween the center leg of the pin before the advancing bar 200, carrying the front crimping die completes its stroke, the anvil meanwh  remaining stationary. During the return or back stroke the cap member 208 strikes a nut 212, adjustably mounted on the rod, thereby retracting the spring pressed anvil and freeing the hair-pin.

Describing now the operation of the crowning plungers, which operation takes place while the partly formed blank is held, as heretofore described, these crowning plungers 213 and the central plunger 214 are mounted in the rear bracket or head 198. The plunger 214 is yieldably supported endwise in a vertically moving main holder 216. The latter has two oppositely arranged downwardly extending arms 217 pivoted to its front face, the adjacent lateral sides of these arms being cut away to clear the head 215 as shown in Fig. 35. In bending downward the plain side legs from the position indicated in dotted lines at the right of Fig. 28 to the position shown in Fig. 41 (after the anvil has been advanced to receive and support the pin thereon) the plunger 214 first yieldably engages the center part of the crown, followed immediately thereafter by the simultaneous action of the lateral bending and crowning tools 218 which engage the adjacent parts of the outwardly spread legs of the pin and gradually bend them downwardly until they stand substantially parallel in a vertical plane, the tools at the same time completely forming or shaping the crown.

The pivoted tool carrying arms 217 heretofore referred to are provided with adjustable side springs 218 arranged to impart a considerable degree of resistance against the arms while the legs are being bent, corresponding with the thickness and stiffness of the wire used. The device also determines the amount of separation or divergence to be given. That is to say the side legs of the hair pin diverge slightly toward their lower end, as shown in Fig. 46. The resistance or tension of the springs 218 is controlled by two adjusting screws 219 mounted in oppositely arranged ears extending from the vertical sides of the bracket 198.

Describing now the manner of actuating the holder 216 which carries the plungers 213 and 214, a rocker arm 220 is secured to a short rock shaft 221 mounted in a bracket 198 and has its headed end seated in an opening 222 in the holder 216. A similar arm 223 is secured to the front end of the rock shaft and is jointed to a vertical link 224. This link 224 is provided with a yoke arm 225 having a cam roller 226 which engages a cam 227 mounted on the upper cam shaft 43 (Figs. 2 and 3). From the foregoing it will be seen that the connections last described impart vertical reciprocatory movement to the plungers as determined by the shape of the cam path. It may be here stated that just prior to the completion of the leg bending operation by the plungers 213, the main carrier is released from the center leg of the then supported pin and moved toward the left and repositioned contiguous to the chuck, the guide plate 102 being moved forwardly at substantially the same time to place the newly severed blank in position over said chuck.

The means for opening the jaws of the carrier to release it from the center leg of the pin are as follows: At or about the instant the descending tools 203 engage the expanded or substantially horizontal side legs of the pin, which is already supported on the anvil 206 as stated, the action of the cam 181 and associated parts moves the rock shaft 192 an angular distance, thereby causing a dog 228 to engage a pivoted spring finger 229 (Figs. 29 and 30) bodily movable with the carrier, (the latter then being in its extremely advanced position) thus forcibly opening the movable jaw member 189, the said latch 190 at the same time springing upward and engaging the back of the lower arm of the jaw member (Fig. 29) and maintaining it in the open locked position until the latch is again tripped by the action of the cam 181 and associated parts hereinbefore described. After the blank has been operated upon as described, it is then subjected to the corrugating and humping operations, the latter operation forming one of the salient features of the present invention. Referring more particularly to Figs. 6 and 31 to 34, the horizontal endwise movable bar 200 heretofore described has the front crimping die or tool 230 removably secured therein, the companion die member 231 being secured in the front end of the endwise slidable rear bar 232, the latter being slidably mounted on the main frame. This rear bar 232 is cut away to receive a short bar 233, the two being adjustably connected by a bolt 234, thereby adapting them to be actuated in substantially the same manner as the bars 199 and 200 heretofore described. The crimping dies are mounted immediately below and contiguous to the under side of the anvil member 206 and capable of movement toward and from each other while the anvil remains stationary, as in supporting the pin. The working devices of the dies 230 and 231 are provided with transverse ribs and grooves 235 and 236 respectively, the ribs of one die fitting the grooves of the opposite die. In other words the members constitute male and female dies. When the uncrimped hair-pin is supported on the anvil, as before stated, the side legs extend downwardly and as the two dies advance toward each other they engage and clamp the adjacent portions of the side legs of the pin between them and bend the wire, thus producing the crimps or corrugations in the side legs of the pin, as indicated clearly in Figs. 45, 46 and 47.

The working-face of each die is provided centrally with a vertical recess 237 in which is removably mounted a relatively narrow die 238. These central dies, of which there are one in each of the die members 230 and 231, form the humping dies. The construction of the humping dies is shown more clearly in Fig. 47 and these dies are so arranged as to form the hump and turned-up end of the hair-pin which forms one of the salient characteristics of the hair pin of the patent heretofore referred to. It will be noted that the side legs are corrugated at the same time that the lower end of the central leg is provided with the hump and upturned end.

The rear crimping and hump forming die holder 232 is actuated in the following manner: A lever 239 is pivoted as shown at 240 to the main frame and is provided with a head 241 engaging a slot in the die 233. The lower end of the lever 239 is provided with a cam roller which engages the cam 242 mounted on the lower cam shaft 46. The construction and manner of operation of these parts being substantially the same as the operation of the opposite die holder 200. The act of retracting the two die holders simultaneously operates and separates the crimping and humping dies and at the same time withdraws the anvil from the thus completed hair pin, the latter then automatically dropping into a suitable receptacle below.

As heretofore stated, my machine is adapted for making hair-pins of various sizes and of various diameters of wire. The several dies employed are constructed to be interchangeably mounted, as well as are other parts which it is not necessary to refer to in detail.

From the foregoing it will be seen that the machine automatically takes a roll of wire, severs it into blanks of predetermined length, points the same and then bends and forms the blank into the complete hair pin and automatically drops it. The construction is such that not only may the machine be operated with a maximum out-put and minimum expense, but the various coöperating parts have been found in practice to operate reliably and with comparatively little wear. The features of adjustment are particularly important inasmuch as it is relatively expensive to have different machines for the various sizes of hair-pins.

The operation of the mechanism will be understood from a careful reading of the foregoing description. It may, however, be briefly described as follows: A supply of wire of desired diameter is put on the reel and its end fed through the straightening device to the initial feeder mechanism. The feeder carriage carries the wire forwardly to the cutters where it is then gripped by the binder and the wire severed into the blank of desired length. This blank, which is now in the movable guide plate, is actuated by the friction secondary feed so that the center of the blank is in alinement with the initial loop forming plunger. The plunger and bending dies descend, forming the loop of the central leg and simultaneously bending out and down the outer leg portions. The plunger and bending dies are then retracted and the twisting chuck mechanism seizes the central bend of the leg, twisting the upper end of the same to form its helical portion. After this twisting operation the central leg is released from the chuck head. The blank is then subjected to the crowning and outer leg forming operations shown in Fig. 41. Finally the outer legs are corrugated and the crimped portion and turned up end formed on the central loop and the pin automatically fed from the machine. It is, of course, understood that during these operations the pin is held by the various gripper mechanisms in order that the blank may be held steady while the various forming operations are performed.

In its broader aspects the invention is not limited to forming the exact type of hair-pin here shown although it is more particularly adapted for the same, particularly for forming the central leg and hump. Accordingly the invention is not limited to the details of construction shown except as set forth in the appended claims.

I claim as my invention:

1. In a machine for making hair-pins, the combination with mechanism for feeding wire blanks, of mechanism for bending each blank centrally into an initial loop portion, mechanism for bending the free upper ends of said loop portion downwardly into substantial parallelism with the closed lower end of said loop portion to form the outer legs, and mechanism for twisting said closed loop at its juncture with said outer legs.

2. In a machine for making hair-pins, the combination with mechanism for feeding wire blanks, of mechanism for bending each blank centrally into an initial loop portion, mechanism for bending the free upper ends of said loop portion downwardly into substantial parallelism with the closed lower end of said loop portion to form the outer legs, mechanism for twisting said closed loop at its juncture with said outer legs, and mechanism for forming a hump in said central leg.

3. In a machine for making hair-pins, the combination with mechanism for feeding wire blanks, of mechanism for bending each blank centrally into an initial loop portion, mechanism for bending the free upper ends of said loop portion downwardly into substantial parallelism with the closed lower end of said loop portion to form the outer legs, and mechanism for tightly closing the upper end of said loop portion at the juncture with said outer legs to form the central leg.

4. In a machine for making hair-pins, the combination with mechanism for feeding wire blanks, of mechanism for bending each blank centrally into an initial loop portion, mechanism for bending the free upper ends of said loop portion downwardly into substantial parallelism with the closed lower end of said loop portion to form the outer legs, mechanism for tightly closing the upper end of said loop portion at the juncture with said outer legs to form the central leg, and mechanism for forming a hump in said central leg below the closed upper end thereof.

5. In a machine for making hair-pins, the combination with means for feeding stock to the cutting device, said means comprising a reciprocatory carriage having a clamping device, of a pair of cutters, binding mechanism for holding the stock during the operation of cutting, mechanism for bending the severed blank upon itself and for bending down the upper ends of said looped blank whereby the blank is initially formed into a central and outer legs, mechanism for twisting the upper end of said central leg, mechanism for crowning the outer legs and bending them into substantial parallelism, all of said operations being carried on automatically and synchronously.

6. In a machine for making hair-pins, the combination with mechanism for severing a roll of stock into blanks of predetermined lengths, mechanism for initially forming said blank into a central loop and outer leg portions, mechanism for twisting the upper end of said central loop, mechanism for crowning said outer leg portions and bending them down into substantial parallelism, mechanism for forming a hump portion in the lower end of said central leg portion, said operations being carried on automatically and synchronously.

7. In a machine for making hair pins, the combination with mechanism for feeding wire blanks, of mechanism for bending each blank centrally into an initial loop portion, mechanism for bending the free upper ends of said loop portion downwardly into substantial parallelism with the closed lower end of said loop portion to form the outer legs, mechanism for tightly closing the upper end of said loop portion at the juncture with said outer legs to form the central leg, and mechanism for forming a hump and an upturned end in said central leg.

8. In a machine for making hair-pins, the combination with mechanism for severing a roll of stock into blanks of predetermined length, cutter mechanism, initial loop forming and leg bending mechanisms, mechanism for twisting the upper end of the said initially formed loop portion, mechanism for crowning the outer leg portions and bending the same downwardly into substantial parallelism, mechanism for corrugating the outer leg portion and for forming a hump in said central portion, and feeding mechanism for conveying the blank to the operating mechanisms, all of said mechanisms being operated automatically and synchronously.

9. In a machine for making hair-pins from a continuous length of wire, the combination of devices for intermittingly feeding the wire and severing it into blanks or units, devices for forming in the unit an elongated twisted loop adapted for forming the crown or head of the pin and bending the two opposed free end portions of the unit to produce the outer or side legs of the pin, mechanism for transferring the unit from said twisting device and positioning it so as to be acted upon by the crowning and bending means, and mechanism for producing a bend or hump in the said center leg portion before the pin is discharged from the machine.

10. In a machine of the character described, the combination with automatically operating mechanisms for feeding, holding and releasing the free end portion of a coil of wire, of an alining central tube through which the wire is advanced, a pair of laterally separated combined wire-severing and pointing cutters, means for rotating the cutters on their axes, mechanism for rotating the cutters bodily around the positioned stationary wire, means for simultaneously moving the revolving cutters toward each other so as to engage and sever the wire and at the same time point its adjacent ends, and means for temporarily returning the cutters to their normal separated position.

11. In a machine of the character described, the combination with a suitably mounted, non-revoluble central tube, and means for feeding a wire longitudinally therethrough, of a pair of positively driven revoluble cutters having the wire positioned between the adjacent rim portions thereof, a revoluble head having the cutter's arbors or spindles tiltingly mounted therein, and mechanism for intermittently moving the cutters nearer to or farther from the axis of the wire, for the purpose described.

12. In a machine for forming wire into hair pins, having a central leg and two outer legs, the combination with feeding mechanism, of cutters for severing the wire into blanks of predetermined length, plunger mechanism for forming the initial loop in the blank, bending dies for forming the outer legs of the hair pin, and mechanism for twisting said initial loop to form the central leg, said operations being carried on in properly timed relation.

13. In a machine for forming wire into hair pins, having a central leg and two outer legs, the combination with feeding mechanism, of cutters for severing the wire into blanks of predetermined length, plunger mechanism for forming the initial loop in the blank, bending dies for forming the outer legs of the hair pin, mechanism for twisting said initial loop to form the central leg, and means for forming a hump portion in said central leg, said operations being carried on in properly timed relation.

14. In a machine of the character described, the combination of a main wire-feeding mechanism, a fixed frame having tools movably mounted therein for bending the wire preparatory to forming the center leg of the hair-pin, and means, including positively revoluble combined severing and pointing cutters, capable of adjustment bodily longitudinally of the machine, and disposed intermediate the said frame and wire-feeding mechanism, whereby the distance between the cutters and the center of the frame may be changed, as desired, to correspond with wire units varying in length.

15. In a machine of the character described, the combination of a fixed frame having tools movably mounted therein for bending the wire, a companion fixed frame having crowning and leg-bending tools or dies mounted therein; the distance between the centers of said frames, longitudinally of the machine, corresponding with the maximum length of the pin to be produced, and means, including a plurality of positively revoluble wire-severing cutters, capable of longitudinal adjustment bodily for positioning the cutters nearer to or farther from the center of the first named frame.

16. In a machine of the character described, provided with wire-feeding mechanism, and means for simultaneously severing the wire unit and pointing its adjacent end and that of the standing wire, the combination therewith of a movable, longitudinally extending guide-plate having a groove therein alining with and adapted to receive the advance end portion of the wire before it is severed from the stock, a stop suitably positioned in the forward portion of said groove, and a device adapted to frictionally engage the unit or blank and advance it against the stop.

17. In a machine of the character described, the combination of a laterally movable guide-plate provided with a longitudinal groove adapted to receive a unit or length of wire, a small friction wheel revolubly mounted on the lower side of and carried by the plate, the periphery of the wheel extending into said groove and adapted to support the wire at that point, a continuously revoluble, yieldingly mounted companion upper friction wheel having its rim adapted to engage the wire, the co-action of both wheels serving to automatically advance the wire unit lying in the grooved part of the plate, and a stop positioned to arrest the endwise movement of the unit.

18. In a machine of the character described, the combination with a guide-plate, and means for positioning a wire unit therein, of a center plunger, a pair of top bending-dies, means for temporarily moving the guide-plate laterally so as to position the unit with relation to said plunger and dies, a pair of laterally separated anvil members, and means operatively controlling the movements of said plunger, dies and anvil members, for the purpose hereinbefore set forth.

19. In a machine of the character described, the combination with a pair of laterally separated anvil members and means for varying the space or opening between them, of a center plunger, means for moving it downward to engage a length of wire positioned thereunder and produce an elongated loop therein by forcing it between said anvil members, and top bending-dies adapted to bend the other or free portions of the wire downward to or below a horizontal plane while the looped part is still held between the said plunger and anvil members.

20. In a machine of the character described, provided with a pair of comparatively thin anvil members, means for opening, closing and positioning them, and an endwise movable center plunger adapted to engage a wire unit positioned thereunder and force the adjacent portion downward between and below the anvils, thus producing in the wire an elongated open center loop, the combination therewith of a chuck-head having normally open jaws or dies, means for positioning the latter so that the said opening registers and is in alinement with the said loop, means for elevating the chuck-head to receive therein the portion of the standing loop extending below the anvils, means for closing the jaws onto said loop portion and at the same time pressing its sides snugly together, means for rotating the chuck-head and twisting the other portion of the loop into a helical form, and means for opening the jaws and returning the chuck to its normal position.

21. In a machine of the character described, the combination of a chuck provided with normally open jaws, means for moving the chuck in an endwise direction, means for closing and opening the jaws at predetermined intervals, means for intermittingly rotating the jaw-carrying chuck, a device for varying the number of revolutions to be given to the chuck, and adjusting means coöperating with said chuck-rotating mechanism for positively stopping the chuck's rotary movement after completing its work, whereby the jaws are left in a predetermined position.

22. In a machine of the character described, the combination of a fixed frame, devices operatively mounted therein adapted for forming a loop center leg in a suitably positioned wire unit, crowning tools operatively mounted in brackets located near the front end of the machine, a main carrier provided with suitable jaws adapted to engage the looped unit, mechanism for actuating the carrier longitudinally of the machine to transfer said unit from the loop-forming tools to the crowning tools, devices for opening and closing the carrier's jaws and yielding means capable of adjustment for minimizing the impact of the carrier at the termination of its stroke.

23. In a machine of the character described, devices for automatically producing a twisted loop in a wire unit, and mechanically actuated crowning-tools, in combination with a longitudinally movable carrier temporarily positioned contiguous to said devices, means for advancing the carrier from said position to receive the said looped part of the unit, means for clamping it therein, and mechanism for moving the carrier so as to transfer the unit and position it with relation to said crowning tools.

24. In a machine of the character described, the combination of a slidably supported carrier provided with jaw members, means for reciprocating the carrier on its support, a rock-shaft having tripping members suitably positioned thereon, means for oscillating said shaft, and devices movable with the carrier adapted, in coöperation with said tripping members, to actuate the jaws.

25. In a machine of the character described, provided with wire-bending and twisting devices, and an anvil and crowning tools disposed with relation to said devices and being separated therefrom longitudinally of the machine a fixed distance, the combination therewith of a main carrier adapted to receive therein a partly completed hair-pin and transfer it to said anvil and crowning tools, means for thus moving the carrier, and means for returning the latter to a point contiguous to the twisting device before the crowning tools have completed their work.

26. In a machine of the character described, a vertically disposed holder, and means for moving it in an end-wise direction, in combination with crowning tools, including central and lateral plungers secured to the holder and being bodily movable therewith, a spring pressed anvil member arranged with respect to said plungers, adapted to support a partly formed hair-pin thereon, and means for actuating the tools to complete the crown and bend the wire downward to form side legs.

27. In a machine of the character described, the combination of a guided vertically movable holder, a spring-pressed central plunger secured thereto, and a pair of swinging side plungers capable of limited lateral movement connected to and movable with the holder, adapted when in use to engage the respective out-spreading portions of a partly formed hair-pin and bend them downward to form side legs.

28. In a machine of the character described, the combination of a guided vertically movable holder, central and side plungers or crowning tools suitably secured thereto and movable with it, the side plungers capable of movement toward and from each other, fixed spring elements bearing against the said side plunger members for limiting the latter's lateral movements, and means for varying the tension or resistance of the springs, as desired.

29. In a machine of the character described, the combination with a suitably mounted, spring-pressed, horizontally disposed anvil member having its inner end portion bifurcated, and mechanism for actuating the anvil, of a central vertical plunger, a pair of laterally movable side plungers having the center plunger positioned therebetween, mechanism for operating the plungers recessed and adapted, in coöperation with said anvil, to bend the end portions of a partly formed hair-pin, when supported on the anvil, downward from the crown to form side legs.

30. In a machine of the character described, the combination of a pair of horizontally mounted, oppositely arranged slidable bars, a block member adjustably positioned in each bar, mechanisms engageable with said block members for actuating the frames toward and from each other at predetermined intervals, and crimping-dies mounted in the proximate faces of the frames.

31. In a machine of the character described, crowning tools, including an anvil and coöperating center and side plungers, adapted to temporarily support an incomplete hair-pin depending therefrom, in combination with a pair of suitably mounted, inwardly facing crimping-dies located below the crowning tools, and mechanism for moving said dies toward each other to engage the adjacent portions or legs of the hair-pin and corrugate the same.

32. In a machine of the character described, the combination of a spring-pressed horizontally mounted anvil member, a stop for arresting its advance movement, a slidably mounted frame located below the anvil, a crimping-die secured to the inner end of the frame, mechanism for actuating the latter, and having the anvil adapted to be withdrawn or retracted from its working position by the movement of the frame.

33. In a machine of the character described, the combination of an endwise movable horizontal frame member arranged transversely of the machine, a crimping-die secured in the inner or forward end of the frame, means for reciprocating the latter a uniform distance during each stroke action, and a member adjustably positioned in the frame and coöperating with said reciprocating means for causing the working face of the crimping die to positively coincide or register with a predetermined point at the end of its stroke.

34. In a machine of the character described, the combination with crowning tools, a bifurcated anvil, and means for actuating the same, of a pair of suitably mounted, oppositely disposed combined crimping and humping dies, and mechanism for concurrently moving the dies toward and from each other in an intermittent manner, whereby, when in use, the dies are capable of corrugating the side legs and at the same time producing a hump in the center leg of a hairpin supported by the crowning tools and anvil.

35. In a machine of the character described, the combination of a pair of oppositely disposed, endwise movable die-holders, male and female corrugating-dies secured in the inner or adjacent ends of the holders, male and female humping-dies, positioned with relation to and movable with the first named dies, and means for actuating said holders in a reciprocatory manner.

36. In a machine for making hair pins, the combination with mechanism for feeding wire blanks, of mechanism for bending each blank into substantially parallel outer legs having free lower ends; mechanism for bending the wire into a central loop portion extending from the upper ends of the outer legs downwardly and between the latter, and mechanism for forcing the sides of said loop together to form the central leg.

37. In a machine for making hair pins, the combination with mechanism for feeding wire blanks, of mechanism for bending each blank into two substantially parallel outer legs having free lower ends; mechanism for bending the wire into a central loop portion extending from the upper ends of the outer legs downwardly and between the latter, mechanism for forcing the sides of said loop together to form the central leg, and mechanism for forming a hump in said central leg.

38. In a machine for making hair pins, the combination with mechanism for feeding wire blanks, of mechanism for bending each blank into two substantially parallel outer legs having free lower ends; mechanism for bending the wire into a central loop portion extending from the upper ends of the outer legs downwardly and between the latter, and mechanism for twisting together the upper ends of said loop portion to form a central leg.

39. In a machine for making hair pins, the combination with mechanism for feeding wire blanks, of mechanism for bending each blank into two substantially parallel outer legs having free lower ends; mechanism for bending the wire into a central loop portion extending from the upper ends of the outer legs downwardly and between the latter, mechanism for twisting together the upper ends of said loop portion to form a central leg, and mechanism for forming a hump in said central leg.

40. In a machine for making hair pins, the combination with a straightening device, of an initial feeding mechanism, gripping mechanism, cutters for severing the wire into blanks of predetermined length while held in said gripping mechanism, a secondary feeding mechanism for the severed blanks, an initial loop forming plunger, bending dies associated with the plunger for forming the blank into a central leg and two outer legs, mechanism for retracting the plunger and bending dies, twisting chuck mechanism for receiving the bent blank, and twisting the central leg portion, and crowning dies for crowning the upper end of the pin, said operations being carried on in properly timed relation.

41. In a machine for making hair pins, the combination with mechanism for feeding wire blanks, of reciprocatory members for bending the blank into a central loop portion and two outer leg portions, twisting chuck mechanism for gripping said initial loop portion and twisting the same, and mechanism for crowning the upper end of the formed blank, said operations being carried on synchronously.

42. In a machine for making hair pins, the combination with mechanism for feeding wire blanks, of mechanism for bending each blank into two substantially parallel outer legs having free lower ends, and mechanism for bending the blank to form a central leg extending from the upper ends of the outer legs downwardly and between the latter.

43. In a machine for making hair pins, the combination with mechanism for feeding wire blanks, of mechanism for bending each blank into two substantially parallel outer legs having free lower ends, mechanism for bending the blank to form a central leg extending from the upper ends of the outer legs downwardly and between the latter, and mechanism for forming a hump in said central leg.

44. In a machine for making hair pins, the combination with mechanism for bending wire blanks, of mechanism for bending each blank into two substantially parallel outer legs having free lower ends, mechanism for bending the blank to form a central leg extending from the upper ends of the outer legs downwardly and between the latter, and mechanism for corrugating the outer leg portions and forming a hump in the central leg.

45. In a machine for making hair pins, the combination with mechanism for feeding wire blanks, of mechanism for bending each blank into two substantially parallel outer legs having free lower ends, mechanism for bending the blank to form a central leg extending from the upper ends of the outer legs downwardly and between the latter, and mechanism for crowning the upper end of said hair pin.

46. In a machine for making hair pins, the combination with mechanism for feeding wire blanks, of mechanism for bending each blank into two substantially parallel outer legs having free lower ends, mechanism for bending the blank to form a central leg extending from the upper ends of the outer legs downwardly and between the latter, mechanism for crowning the upper ends of said legs, and mechanism for forming a hump in said central leg.

47. In a machine for making hair pins, the combination with feeding mechanism, of mechanism for severing a wire into blanks of predetermined length, mechanism for initially bending the blanks to form three legs, mechanism for twisting and forming a hump in the initially bent blank, and mechanism for conveying the initially bent blank to the twisting and hump-forming mechanism.

48. In a machine for making hair pins, the combination with mechanism for feeding wire blanks, of mechanism for bending each blank centrally into an initial loop portion, mechanism for bending the free upper ends of said loop portion downwardly into substantial parallelism with the closed lower end of said loop portion to form the outer legs, mechanism for twisting said closed loop at its juncture with said outer legs, and mechanism for crowning the upper end of said hair pin.

49. In a machine for making hair pins, the combination with mechanism for forming a leg from the central part of the blank, bending the ends of the blank outward, and twisting said central leg, of devices for transferring and supporting the blank to crowning mechanism and retracting said transferring and supporting devices in advance of action of the mechanism for crowning, and finally bending the outer legs of the pin to approximate parallelism and crowning the same.

50. In a machine for making hair pins, the combination with mechanism for forming a leg from the central part of the blank, bending the ends of the blank outward, and twisting said central leg, of devices for transferring and supporting the blank to crowning mechanism and retracting said transferring and supporting devices in advance of action of the mechanism for crowning, finally bending the outer legs of the pin to approximate parallelism and crowning the same, and devices for imparting a hump to the central leg.

ISAAC H. SISSON.

Witnesses:
MARK D. GOODMAN,
J. F. GOLDBERG.